Oct. 27, 1942.    R. D. PIKE    2,300,171
APPARATUS FOR CHURNING UNDER VACUUM
Filed Nov. 14, 1938    2 Sheets-Sheet 1

INVENTOR.
Robert D. Pike.
BY
Chas. E. Townsend.
ATTORNEY.

INVENTOR.
Robert D. Pike.
BY
Chas. E. Townsend.
ATTORNEY.

Patented Oct. 27, 1942

2,300,171

UNITED STATES PATENT OFFICE 2,300,171

APPARATUS FOR CHURNING UNDER VACUUM

Robert D. Pike, Piedmont, Calif., assignor to A. W. Stitt, San Francisco, Calif.

Application November 14, 1938, Serial No. 240,293

4 Claims. (Cl. 31—34)

The present invention relates to an apparatus for churning butter or the like under partial vacuum or sub-atmospheric pressure, and also for the treatment of the substance being churned with an inert or germicidal gas during the churning operation.

It is an object of the present invention to provide means forming a communication continuously between the upper or empty part of a rotating churn and evacuating force, and at the same time admitting air or another gas into the lower part of the rotating churn or that part which contains liquid and butter.

It is a further object of the invention to provide means for churning butter which effects substitution of an inert, germicidal gas, such, for example, as carbon dioxide, for the air ordinarily contained in cream and butter fat.

Another object of the invention is to provide means for controlling the temperature of the liquid being churned by the introduction of steam, cold carbon dioxide gas, or other temperature-cooling mediums into the liquid as it is being churned and at any desired time either before, during or after the churn is subjected to a partial evacuation.

A still further object of the invention is the provision of apparatus which will make possible the partial evacuation of a churn during its operation, regardless of whether it is a churn which revolves within a stationary, air-tight casing or whether the rotatable part of the churn itself is constructed in an air-tight manner.

Further objects and advantages of the invention will become apparent from the following specification, in which reference is made to the accompanying drawings.

Figure 1:
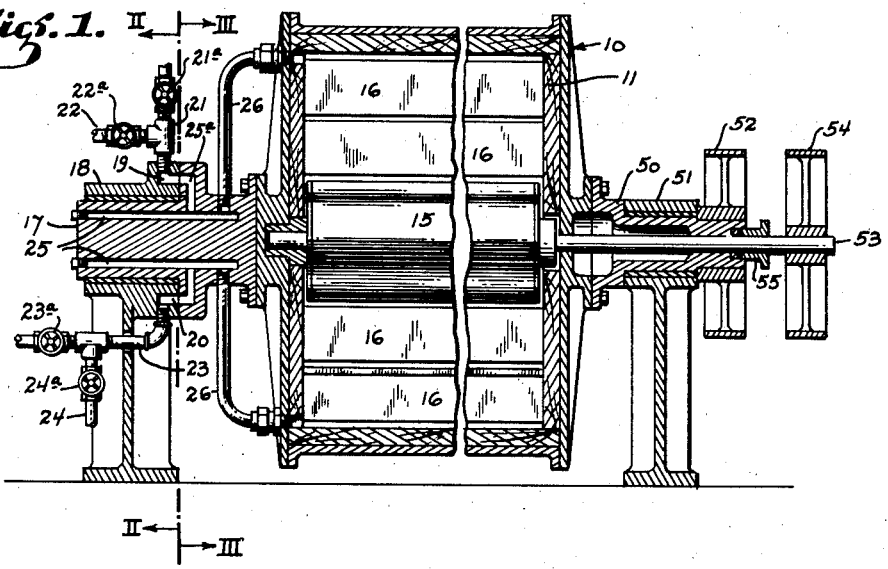
Fig. 1 is a vertical, longitudinal section of a churn embodying the present invention, the churn being of that type in which the rotatable portion is air-tight and constructed to resist pressure.
Figure 2:
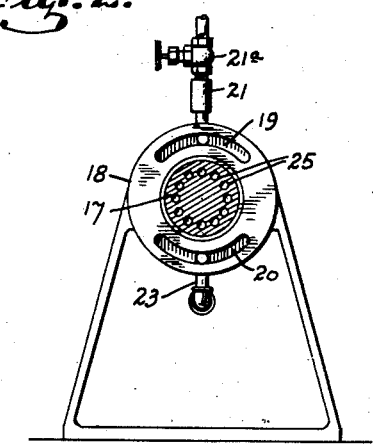
Fig. 2 is a sectional view taken on the line II—II of Fig. 1.

Referring in detail to Fig. 1 of the drawings, a rotatable churn is illustrated as comprising an outer, metallic, air-tight and pressure-resisting casing 10. This churn is lined with wood, as indicated at 11, and it is to be understood that while wood is considered an appropriate material for the inner lining of butter churns, other materials may be used, and the present invention is not limited to a churn having a wood lining but may be entirely of metal or of metal lined with any suitable material instead of the wood 11. The churn illustrated in the present instance includes a central rotatable worker 15 and worker shelves 16 which are conventional in construction and which operate in the usual well-known manner. The worker 15 and shelves 16 form no part of the present invention, which is equally well adapted to churns having workers of different types than those here described, as well as churns in which no workers are employed. The churn is supported for rotation at its left hand end as viewed in Fig. 1 by a shaft 17 which is rotatably mounted in a suitable bearing 18. The bearing 18 is enlarged at its outer periphery toward one end to provide for an arcuate space 19 opening toward the inner face of the bearing, as best illustrated in Fig. 2. The extent of the arcuate space 19 falls somewhat short of the arc subtended by the upper or empty segment of the churn when it is approximately half full of liquid. A similar arcuate opening 20 is formed in the lower portion of the enlarged end of the bearing 18 for communication, through means presently to be described, with the lower or liquid-containing half of the churn. The arcuate opening 19 may be tapped from its upper side by a pipe 21 controlled by a valve 21a, which pipe may communicate with a vacuum pump, and a branch pipe 22 controlled by a valve 22a may provide a vent to the atmosphere. The lower arcuate space 20 is tapped by a pipe 23 controlled by a valve 23a and branch pipes of any desired number, such as the one indicated at 24 and controlled by a valve 24a, may serve to form a communication between the arcuate space 20 and sources of supply of various fluids, such, for example, as cold carbon dioxide, compressed air, atmospheric air, steam, or the like. One such pipe, if desired, may also be connected with a source of vacuum and the number of such pipes employed, as well as the types of fluids which may be permitted to enter through the arcuate space 20, will be determined in each case by the particular method that is being employed in the operation of the churn.

Figure 3:
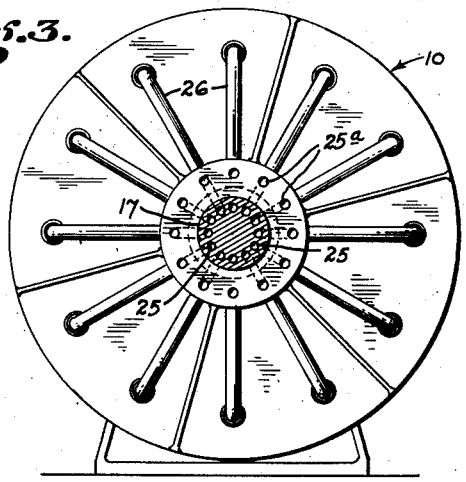
Fig. 3 is a sectional view taken on the line III—III of Fig. 1.
Figure 4:
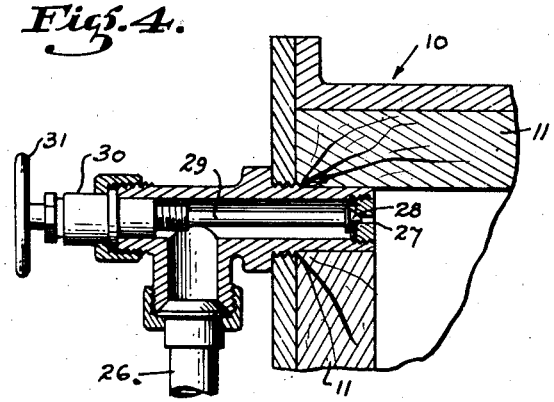
Fig. 4 is an enlarged sectional view of a portion of the churn illustrated in Fig. 1 and showing details of a modification in structure of this portion of the churn.

In order to establish communication between the arcuate spaces 19 and 20 and the upper and lower interior portions of the churn, respectively, the shaft 17 is provided with a plurality of longitudinally extending, circumferentially spaced bores 25. The bores 25 are plugged at their outer ends and are intercepted by ports 25ª, the open ends of which are shown in Fig. 3, and which register successively and alternately with the openings 19 and 20 upon rotation of the shaft and churn. At their inner ends the bores 25 are tapped to receive a plurality of pipes 26, which pipes extend radially, and enter the end of the churn at spaced intervals adjacent its outer periphery. The ends of the pipes 26 where they enter the churn may be reduced to orifices of any desired size or may be controlled by valves in the manner illustrated in Fig. 4. In Fig. 4 an orifice 27 entering the churn is shown as closed by a valve 28, a stem 29 of which passes through a suitable stuffing box 30 for operation by an exteriorly positioned handwheel 31. It is also possible, if desired, to extend the pipes 26 into the churn, where they may be embedded in the cylindrical wall of the churn and provided with small openings spaced throughout the entire length of the churn.

In operation the churn is substantially half full of cream and is rotated to produce the churning action. The valve 21ª is then opened to form a communication between the vacuum pump and the arcuate opening 19, and consequently as the churn and shaft 17 rotate the pipes 26 will be brought successively into communication with the source of vacuum during the time that they are in their upper position or communicating with the empty upper half of the churn. This will effect evacuation of the churn to the desired degree and simultaneously any of the valves 23ª or 24ª may be opened to effect the passage of a suitable gas through the arcuate opening 20 and consequently through the pipes 26 during the time when they are in their lower position and in communication with the liquid containing portion of the churn. If desired, the pipes 26 may be kept clear of liquid while their ends are submerged in the churn by simply opening a valve which will admit a small flow of atmospheric air, or the cream in the churn may be sterilized and deodorized by the introduction of sterile carbon dioxide gas, which will displace the air which is drawn off through the pipes 26 during the upper portion of their cycle. The carbon dioxide gas so introduced may be cold if a refrigerant is desired, or steam may be admitted in the place of this gas if it is desired to raise the temperature of the contents of the churn; thus the interior of the churn may be maintained at subatmospheric pressure while at the same time gases for heating, cooling or otherwise treating the contents of the churn may be continuously introduced.

If it is desired to effect an unusually low pressure within the churn, as is sometimes deemed advisable, just prior to the completion of the churning operation, the valves 23ª and 24ª may be closed and the valve 21ª may be permitted to remain open to form communication between the interior of the churn and the vacuum pump. Under these conditions liquid from the interior of the churn may accumulate in the pipes 26 as they pass through the lower portion thereof, and as any such liquid within the pipes would be withdrawn by the vacuum pump, a conventional liquid trap, not shown, may be connected in the vacuum line to eliminate such liquid before it reaches the vacuum pump.

After the churning operation is completed the buttermilk may be conveniently withdrawn by stopping the churn and closing all but one of the valves 28, illustrated in Fig. 4. The valve left open will be that in the lowermost position and vacuum may be applied to withdraw the buttermilk through this valve, or if an upper valve is also left open, pressure directed into the churn through the upper valve to flow out through the lowermost open valve.

Figure 5:
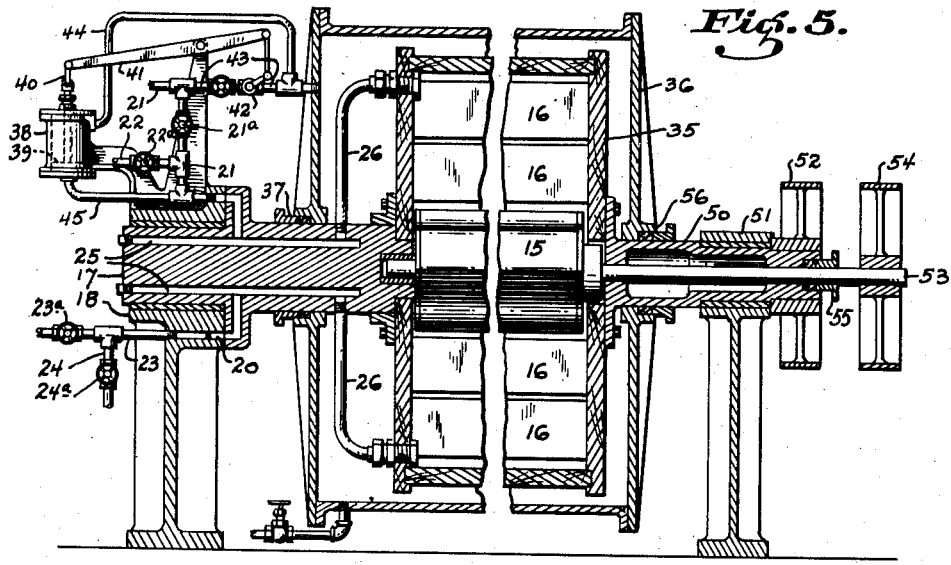
Fig. 5 is a vertical, longitudinal section of a churn embodying my invention, the churn illustrated being of that type in which the rotatable churning portion is surrounded by a stationary casing of air-tight and pressure-resisting construction.

The modified form of the invention which is illustrated in Fig. 5 is similar to that described above, with the exception that a rotatable churn 35 is illustrated as contained by a stationary, air-tight casing 36. In this case, the shaft 17 extends through a stuffing box 37 in the end wall of the casing 36. As the wooden churn 35 is incapable of withstanding unusual pressures, it is necessary to maintain the same pressure in the space between the churn 35 and casing 36 as is maintained within the churn. This is effected by an automatic control means which includes a cylinder 38 containing a reciprocable piston 39 connected by a rod 40 with a lever 41, which operates a valve 42 in a line 43 which communicates with the interior of the casing 36. The pressure within the casing 36 is transmitted to the upper end of the cylinder 38 through the medium of a pipe 44 and the pressure within the churn 35 is transmitted to the lower end of the cylinder 38 through pipes 26, bores 25 in the shaft 17, and a pipe 45. During the churning operation, if the pressure within the churn is less than that outside the churn and in the casing 36, the piston 39 is drawn downwardly to open the valve 42 and effect evacuation of the casing 36. When sufficient evacuation is obtained here, the piston will again be drawn upwardly to close the valve 42. In this way the pressure is maintained substantially the same both inside and outside of the churn 35 so that no strain is applied to its walls.

Figure 6:
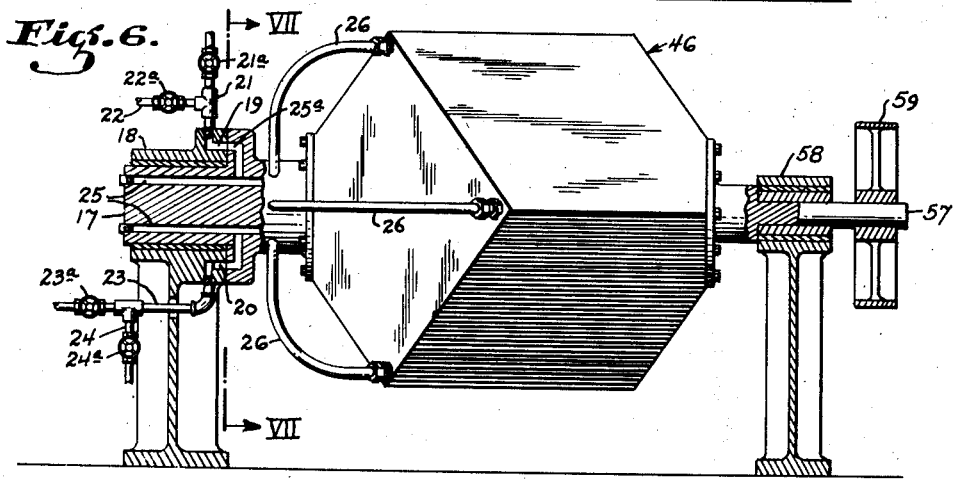
Fig. 6 is a front elevation with parts shown in section of a cubical type of churn embodying the present invention.
Figure 7:
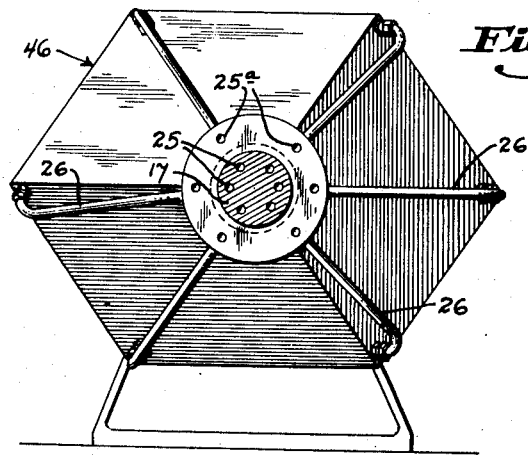
Fig. 7 is a sectional view taken on line VII—VII of Fig. 6 showing the cubical churn of Fig. 6 in end elevation.

The manner in which the present invention may be applied to a cubical churn is illustrated in Figs. 6 and 7, in which the cubical body of the churn is shown at 46. The cubical churn 46 is supported for rotation by bearings, as shown, upon an axis which passes through two of its diagonally opposite corners. In this type of churn no internal working members are used, but the shape of the churn itself serves to work the butter. In the application of the present invention to this churn, the bearing 17 and its associated parts are identical with those described above, with the exception that there are but six of the pipes 26 and each of these pipes enters the churn at one of its corners, as is best illustrated in Fig. 7. The invention when applied to this type of churn serves, as in the forms described above, effectively to withdraw pressure from the uppermost part of the churn as well as to introduce any desired gas or treating medium to the lowermost part of the churn as it rotates during the churning operation.

The gas which is introduced into the churn during its operation, in addition to the several purposes set forth above, may be employed to effect agitation of the cream, supplementing that caused by rotation of the churn, and such agitation, especially during the initial stage of the churning operation, assists in speeding up the flocculation of the butter fat.

In each of the above-described modifications of the invention, suitable means are provided for imparting rotation to the churn, and in cases where a central worker is used it is usually rotated in a direction opposite to that of the churn. Likewise in each of the modifications conventional openings capable of being sealed in closed position are provided, though not shown in the drawings, for the purpose of inserting cream and removing butter from the churn.

Referring to Fig. 1, the churn is shown as supported by a hollow drive shaft 50 which extends through a bearing 51 and has a drive pulley 52 secured to its outer end, through which rotary motion may be imparted to the churn through a suitable motor. Internal worker 15 is driven through the medium of a shaft 53 extending through the hollow shaft 50 and having a drive pulley 54 at its outer end. A suitable stuffing box 55 may be employed where the shaft 53 emerges from the hollow shaft 50. The construction is similar in the modification shown in Fig. 5, except that in this case the hollow shaft 50 extends through a stuffing box 56 provided in the end of the stationary casing 36. In the cubical type of churn illustrated in Fig. 6, the churn is supported and driven by a simple shaft 57 which extends through a bearing 58 and is provided with a drive pulley 59; there being no internal worker in this churn, the simple form of drive mechanism shown will suffice to impart rotary motion to the churn.

While some features of the present invention have been set forth more or less specifically for purposes of illustration, it is of course to be understood that the invention is not limited by this specific disclosure, but its scope is defined in the appended claims.

I claim:

1. A pressure-withstanding rotatable butter-making churn provided with a concentric rotatable shaft containing a plurality of eccentrically disposed longitudinal bores, each communicating with a duct to the interior of the churn at its peripheral extremity, means for connecting the said ducts in the upper segment of their rotation and while they are in communication with the interior of the churn above the normal liquid level therein with a source of vacuum, and means for isolating the said ducts from the said source of vacuum in the lower segment of their rotation and while they are in communication with the interior of the churn below the normal liquid level.

2. A pressure-withstanding rotatable butter-making churn provided with a concentric shaft containing a plurality of eccentrically disposed longitudinal bores, each communicating with a duct to the interior of the churn adjacent its peripheral extremity, means for connecting the said ducts in the upper segment of their rotation and while they are in communication with the interior of the churn above the normal liquid level therein with a source of vacuum, and means for connecting the said ducts in the lower segment of their rotation while they are in communication with the interior of the churn below the normal liquid level with a source of gas at a greater pressure than that prevailing within the churn.

3. A rotatable cubical butter-making churn provided with a shaft extending symmetrically from one of its corners containing six concentrically disposed longitudinal bores, each communicating with a duct to the interior of the churn at one of its six corners, means for connecting the said ducts in the upper segment of their rotation while in communication with the interior of the churn above the liquid level therein with a source of vacuum, and means for isolating the said ducts from the said source of vacuum in the lower segment of their rotation while in communication with the interior of the churn below the liquid level therein.

4. A rotatable cubical butter-making churn provided with a shaft extending symmetrically from one of its corners containing six eccentrically disposed longitudinal bores, each communicating with a duct to the interior of the churn at one of its six corners, means for connecting the said ducts in the upper segment of their rotation while in communication with the interior of the churn above the liquid level with a source of vacuum, and means for connecting the said ducts in the lower segment of their rotation while in communication with the interior of the churn below the liquid level with a gas under a pressure greater than that existing within the churn.

ROBERT D. PIKE.